United States Patent
Begen et al.

(10) Patent No.: US 8,046,823 B1
(45) Date of Patent: Oct. 25, 2011

(54) SECURE APPLICATION BRIDGE SERVER

(75) Inventors: Geoffrey Charles Begen, Lake Forest, CA (US); Keith David Bussell, Los Angeles, CA (US)

(73) Assignee: Stamps.com Inc., Los Angeles, CA (US)

( * ) Notice: Subject to any disclaimer, the term of this patent is extended or adjusted under 35 U.S.C. 154(b) by 1188 days.

(21) Appl. No.: 11/542,654

(22) Filed: Oct. 3, 2006

(51) Int. Cl.
*G06F 7/04* (2006.01)
*G06F 17/30* (2006.01)
*G06F 15/16* (2006.01)
*H04L 29/06* (2006.01)

(52) U.S. Cl. .................. 726/3; 726/2; 726/12; 726/14; 726/15

(58) Field of Classification Search .................. 726/2–3, 726/12, 14–15
See application file for complete search history.

(56) References Cited

U.S. PATENT DOCUMENTS

| | | | | |
|---|---|---|---|---|
| 5,586,260 | A | * | 12/1996 | Hu .................... 726/12 |
| 6,006,333 | A | * | 12/1999 | Nielsen .............. 726/8 |
| 6,052,785 | A | | 4/2000 | Lin et al. |
| 6,067,623 | A | | 5/2000 | Blakley, III et al. |
| 6,199,077 | B1 | | 3/2001 | Inala et al. |
| 6,205,480 | B1 | | 3/2001 | Broadhurst et al. |
| 6,606,663 | B1 | | 8/2003 | Liao et al. |
| 6,678,731 | B1 | | 1/2004 | Howard et al. |
| 6,934,706 | B1 | * | 8/2005 | Mancuso et al. .................. 1/1 |
| 6,985,946 | B1 | * | 1/2006 | Vasandani et al. ........... 709/225 |
| 7,039,714 | B1 | | 5/2006 | Blakley, III et al. |
| 7,076,795 | B2 | * | 7/2006 | Hahn ............................. 726/2 |
| 7,137,006 | B1 | * | 11/2006 | Grandcolas et al. ......... 713/180 |
| 7,237,261 | B1 | * | 6/2007 | Huber et al. ................... 726/12 |
| 7,243,842 | B1 | | 7/2007 | Leon et al. |
| 7,568,218 | B2 | * | 7/2009 | Garg et al. ...................... 726/4 |
| 2001/0005887 | A1 | | 6/2001 | Boroditsky et al. |
| 2001/0047335 | A1 | | 11/2001 | Arndt et al. |
| 2002/0178354 | A1 | | 11/2002 | Ogg et al. |
| 2003/0065940 | A1 | | 4/2003 | Brezak et al. |
| 2003/0083894 | A1 | * | 5/2003 | Bell et al. ........................ 705/1 |
| 2003/0149781 | A1 | * | 8/2003 | Yared et al. .................. 709/229 |
| 2003/0191711 | A1 | | 10/2003 | Jamison et al. |
| 2004/0059909 | A1 | * | 3/2004 | Le Pennec et al. ........... 713/153 |
| 2004/0098595 | A1 | * | 5/2004 | Aupperle et al. ............. 713/185 |

(Continued)

FOREIGN PATENT DOCUMENTS

EP 998091 A2 * 5/2000

OTHER PUBLICATIONS

Kifer et al., "Database Systems: An Application-Oriented Approach", 2005, Addison-Wesley, Second Edition, pp. 44, 76-78.*

(Continued)

*Primary Examiner* — Michael Simitoski
(74) *Attorney, Agent, or Firm* — Fulbright & Jaworski L.L.P.

(57) ABSTRACT

Systems and methods are provided which implement a bridge server to provide user access to one or more secure applications. A bridge server of embodiments is disposed between a user and a secure application and invokes bridge server security protocols with respect to the user and secure application security protocols with respect to the secure application. In operation according to embodiments, client applications will link into a bridge server, the user will be authenticated by the bridge server, and a valid user will be correlated to an account of the secure application by the bridge server. Bridge servers of embodiments facilitate providing features with respect to secure application user access unavailable using the secure application security protocols.

47 Claims, 4 Drawing Sheets

U.S. PATENT DOCUMENTS

2004/0250118 A1 12/2004 Andreev et al.
2005/0004837 A1 1/2005 Sweeney et al.
2005/0005094 A1 1/2005 Jamieson et al.
2005/0114701 A1 5/2005 Atkins et al.
2005/0154887 A1 7/2005 Birk et al.
2005/0171863 A1 8/2005 Hagen
2006/0075475 A1 4/2006 Boulos et al.
2006/0080731 A1 4/2006 Zhang et al.
2007/0220062 A1 9/2007 Carberry et al.

OTHER PUBLICATIONS

Miller et al, "Kerberos Authentication and Authorization System", Project Athena Technical Plan, Oct. 27, 1998, pp. 4, 9, 11, 27-28.*

Pearlman, L. and C. Kesselman. "The Community Authorization Service: Status and Future", Mar. 2003.*

Plante, Ray and Bruce Loftis. "A VO-friendly, Community-based Authorization Framework", Mar.-Apr. 2005.*

Welch, Von et al. "A AAAA model to support science gateways with community accounts", Mar. 2006.*

Agrawal, Manish et al., "A Conceptual Approach to Information Security in Financial Account Aggregation", 2004, pp. 619-626.

Emery, David, "All About Account Aggregation", Jun. 2002, 5 pgs.

Kifer et al., "Database Systems: An Application-Oriented Approach", 2005, Addison-Wesley, Second Edition, pp. 44, pp. 76-78.

Miller et al, "Kerberos Authentication and Authorization System", Project Athena Technical Plan, Oct. 27, 1998, pp. 4, 9, 11, 27-28.

* cited by examiner

SECURE APPLICATION BRIDGE SERVER

CROSS-REFERENCE TO RELATED APPLICATIONS

The present application is related to U.S. patent application Ser. No. 11/542,658 entitled "Systems and Methods for Single Sign in for Multiple Accounts," filed concurrently herewith, and Ser. No. 09/692,747 entitled "Machine Dependent Login for On-Line Value-Bearing Item System," filed Oct. 18, 2000, now U.S. Pat. No. 7,251,632, the disclosures of which are hereby incorporated herein by reference.

TECHNICAL FIELD

The present invention is related generally to providing access to secure applications and, more particularly, to providing access to secure applications using a bridge server configuration.

BACKGROUND OF THE INVENTION

Various secure applications provide restrictions on user access and user access protocols for a number of reasons. User access is restricted in order to protect sensitive data, value in an account, etcetera. User access protocols are adopted to ensure compliance with governmental regulations or requirements, business goals, etcetera. As user needs change, regulations or requirements are revised, and business goals change it may be burdensome to alter the secure interface of many secure applications.

As but one example of a secure application, postage printing applications provide user control and access to postage value for generating and printing postage indicia. Online postage generation and printing is provided through the use of secure postal servers having crypto vaults for storing postage credit. Postal clients, uniquely configured to implement the security protocols of the secure postal servers, allow a user to remotely access a postal server and perform functions with respect to an associated account, such as query a balance, add postage value, and deduct postage value and generate a postage indicia.

User access to such secure postal servers has been tightly controlled, such as by postal service rules and regulations establishing the types of user credentials that are to be used, the number of user credentials allowed to be active with respect to an account, etcetera. For example, current configurations of secure postal servers, in accordance with postal regulations, provides a single customer identifier (e.g., a business in the case of a commercial account or an individual in the case of a private user account) in association to a postal account. However, for various reasons (e.g., internal accounting reasons), a customer may desire to provide multiple uniquely identified users access to the postal account. At present, the solution has been to allow users of the postal account to input reference information (e.g., notes for identifying a business department, project, user, etcetera) in association with certain operations (e.g., printing postage). Such reference information may easily be erroneously input or even maliciously misinput, thus often resulting in it being of little value.

Many such secure applications have substantial amounts of code dedicated to implementing particular security protocols and user access restrictions known to meet applicable rules, regulations, and objectives and which are acceptable to the appropriate entities (e.g., governmental agencies, business partners, etcetera). As new security protocols are determined to be acceptable, as new user access scenarios are identified, and/or new technologies are developed it can be difficult and costly to implement changes in the secure applications to facilitate use of these developments.

For example, as postage printing applications providing remote user access over a public network, such as the Internet, were being developed, a lack of history with respect to security protocols may have suggested that clients should be utilized by users which employ security protocols unique to the secure postal servers. Such clients require that a user obtains client software, such as by disk or download, in order to be able to access the corresponding secure server, thus making their use somewhat inconvenient for users, at least initially. Clients employing proprietary security protocols (referred to hereinafter as proprietary clients) are also more difficult to integrate into other products, such as software providing symbiotic functions, and thus presents a barrier to adoption and integration by third party vendors. Moreover, various embodiments of such security protocols may have implemented features which made them unique to the particular terminal using the security protocol, requiring re-registration when the same user (or user accessing the same account) attempts to access the secure postal server from a different user terminal.

As security technology improves and as historical information is developed with respect to remote user access to such secure applications, it may be determined that one or more of the secure access protocol features is not necessary. However, the secure access protocol may be deeply embedded in the secure application and/or tightly coupled to the operation of various features thereof, requiring substantial time and effort to implement even seemingly simple changes. Moreover, because it is generally the secure application itself which is to be altered in such situations, any changes to the secure access protocol may require testing and approval by particular entities prior to its implementation, such as to confirm that overall security with respect to accounts etcetera has not been compromised.

BRIEF SUMMARY OF THE INVENTION

The present invention is directed to systems and methods which implement a bridge server to provide user access to one or more secure applications, such as postage printing applications. A bridge server of a preferred embodiment is disposed between a user and a secure application and invokes bridge server security protocols with respect to the user and secure application security protocols with respect to the secure application. Accordingly, new security protocols may be implemented and/or security protocols may be altered without requiring changes to the secure application security protocols.

According to an embodiment of the invention, a bridge server may be implemented as a web server that is exposed to a public network, such as the Internet, disposed between a client application (e.g., operable upon a terminal at the user's location) and one or more servers hosting secure applications. In such an embodiment, the bridge server becomes the public interface for the secure applications. Accordingly, an additional layer of isolation or protection is provided with respect to the secure applications as their servers may be only indirectly coupled to the public network (i.e., through one or more bridge servers), in contrast to direct connection to the public network as may be typical for the server's native security protocols.

In operation according to a preferred embodiment, client applications will communicate with a bridge server, the user will be authenticated by the bridge server (e.g., using a user name and password), and a valid user will be correlated to an account of the secure application by the bridge server. The bridge server will thus negotiate with the secure application using the native security protocols of the secure application to access the appropriate account on behalf of the user. Accordingly, there are multiple authentications according to embodiments of the invention; one in the session between the client and the bridge server, and one in the session between the bridge server and the secure application. When the user's credentials have been authenticated, transactions may then flow from the client to the bridge server. The bridge server will translate those transactions into the native protocol of the secure application, if necessary, and then the secure application will send responses to the client through the bridge server, with the bridge server translating such responses if necessary.

User authentication by a bridge server of embodiments of the invention preferably utilizes substantially standard (i.e., widely accepted) credentials, such as user name and password. Accordingly, a thin client, simple browser interface, or other easily implemented client configurations may be supported by embodiments of the invention. Moreover, integration with third party applications and/or systems may be relatively easily accommodated. Additional credentials as may be needed by the secure application are preferably stored in a database of the bridge server, and may be referenced by the credentials provided to the bridge server (e.g., by user name). Once the bridge server has validated the user (e.g., validated the password as properly associated with the user name), the bridge server can access the secure application credentials and implement a bridge between the client and secure application.

Embodiments of the present invention abstract the security model of the secure application, facilitating the use of much less expensive ways for changing the security model without the need to rewrite, and perhaps recertify, the back end system. A bridge server of embodiments provides an interpreter for a new, simpler easier to use protocol (e.g., simpler and easier to use in the sense that it is less cumbersome for clients to interact with the bridge server using its protocols than to interface with the security application using its protocols). For example, embodiments of the invention support standard web clients or other standardized security protocol clients (hereinafter collectively standardized clients), and thus do not require special code running on the client machine in order to successfully and fully interact with a secure application. Accordingly, issues of complexity with respect to interfacing with particular secure applications are reduced without the need to rewrite the backend system. Moreover, third party systems and applications may readily interface with a bridge server using industry standard protocols rather than proprietary protocols implemented by a corresponding secure application.

Bridge servers of embodiments of the invention provide a high level of security with respect to a user's access to a secure application and thus, although utilizing different security protocols, provide a desired and appropriate level of security. Communications between a client and a bridge server of embodiments are encrypted (e.g., using secure socket layer (SSL) communications) to prevent eavesdropping or snooping by systems or individuals other than an intended recipient. Moreover, a session is preferably maintained between the client and the bridge server as a client conversation which is constantly updated as transmissions are made by the bridge server to the client. This updated client conversation information prevents a replay attack (e.g., where the user or an eavesdropper attempts to replay a transaction).

Embodiments of the invention utilize an authenticator string passed between a client and bridge server in order to detect attacks with respect to a client conversation. In operation according to one embodiment, when a user initially logs on to the bridge server, the bridge server authenticates the user's credentials (e.g., comparing the user name and password to information stored by the bridge server) and issues an authenticator string to the client if the authentication is successful. If the authentication is unsuccessful, the user is not permitted access to the bridge server functions, and thus is prevented access to the secure application functions. The authenticator string is returned by the client with the subsequent communication, the authenticator string is validated by the bridge server, and a new authenticator string is returned to the client with any responsive communication by the bridge server. By constantly updating the authenticator string in this manner, a replay attack is readily detected. Moreover, communications outside of the client conversation, even those were the user is innocently logged on from a different terminal, is readily detected due to the authenticator string (although perhaps being a legitimate authenticator string) being out of sync.

In addition to or in the alternative to providing the aforementioned security abstracting, bridge servers of embodiments of the invention facilitate providing features with respect to secure application user access unavailable using the secure application security protocols. For example, the mapping of the bridge server user credentials to secure application user credentials may be one to many, thereby facilitating multi-user access with unique multi-user identification. Specifically, embodiments of the invention provide multiple users in association with one secure application account.

By supporting multiple user names and passwords for a secure application account, reports provided for account administration may provide detail with respect to use of the account by each individual user. For example, in a postage metering application, instead of a list of postage indicia prints and account deposits, perhaps accompanied by reference information input by a user, embodiments of the present invention provide detailed reports showing postage indicia printed for each individual user and deposits made by individual users.

User configuration and management provided by a bridge server of embodiments of the present invention provides for various users having different levels of access to, or access to different features of, the secure application and/or bridge server. For example, various users may be allowed to query an account balance and to conduct a transaction debiting the account (perhaps limited to a certain value, aggregate value per period of time, etcetera), whereas other users may only be allowed to deposit funds into the account. The bridge server of embodiments provides for an administrative user that is associated with a secure application account, such as to create additional users, establish limits on the features and functions of the bridge server and/or secure application such users are allowed to access, disable individual user's access to the bridge server and/or secure application, etcetera. It should be appreciated that, in the foregoing embodiment, when a user associated with a business' secure application account is no longer associated with that business, the user's access may be terminated without disrupting other user's access to the secure application account. This is so even though the secure application security protocol ties the secure application account to a single set of user credentials associated with the business entity.

Where the secure application has a value account associated therewith, such as a postage value account in a postal server, access to the secure application account by the multiple users may be serialized so that the multiple users that are sharing units from the value account which are simultaneously logged into the bridge server access the account one at a time. For example, the interaction between the bridge server and secure application hosting the value account may be serialized with respect to completing transactions for each user to ensure that account information is kept in sync. In operation according to embodiments, the bridge server manages the multi-user connections to make sure that when a first user is performing a transaction with respect to the value account (e.g., increasing a value amount, decreasing a value amount, querying a value amount, etcetera), the bridge server causes a transaction associated with a second user to wait for the first transaction between the bridge server and secure application to complete before initiating the second transaction.

Because the bridge server of embodiments of the invention acts as a layer between the client and the secure application, the bridge server may not only provide multiple users access to a single secure application account, but may provide users access to multiple secure application accounts. Accordingly, a user's credentials at a bridge server may map to a plurality of secure applications. For example, a business entity may have postage printing accounts with postal authorities in a plurality of countries, wherein a bridge server of an embodiment of the present invention provides particular users identified with that business entity access to multiple ones of the various country's postage printing applications using a single set of credentials provided to the bridge server. Similarly, a business entity may have postage printing accounts with various carriers, whether in one or many countries, wherein a bridge server of an embodiment of the present invention provides particular users identified with that business entity access to multiple ones of the various carriers secure applications using a single set of credentials provided to the bridge server.

The bridge server security protocol of embodiments of the invention relies solely on user credentials which travel with the user (e.g., user name and password), and thus is not tied to a particular user terminal. Accordingly, a user may move from terminal to terminal when accessing a secure application without having to go through a re-registration process, even where the secure application security protocol utilizes credentials unique to the particular terminal accessing the secure application, because the bridge server effectively acts as the client with respect to the secure application. Although allowing a user to move from terminal to terminal as desired, embodiments of the invention prevent the same user from logging into a bridge server and interacting with a secure application simultaneously from multiple terminals (or in multiple sessions on one terminal). For example, the aforementioned authenticator string will only be valid for a last to log on client, thereby preventing multiple simultaneous sessions using the same user credentials.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

In order to aid in the understanding of concepts of the present invention, embodiments are described herein with reference to postage printing applications. However, it should be appreciated that concepts of the present invention are applicable to a number of secure applications (i.e., applications implementing security protocols with respect to user access to one or more features or functions thereof), whether providing postage printing functionality or not. Moreover, although the postage printing applications described with respect to embodiments herein comprise value accounts, it should be appreciated that embodiments of the present invention may be implemented with respect to various secure applications, whether or not they have value accounts associated therewith.

Figure 1:
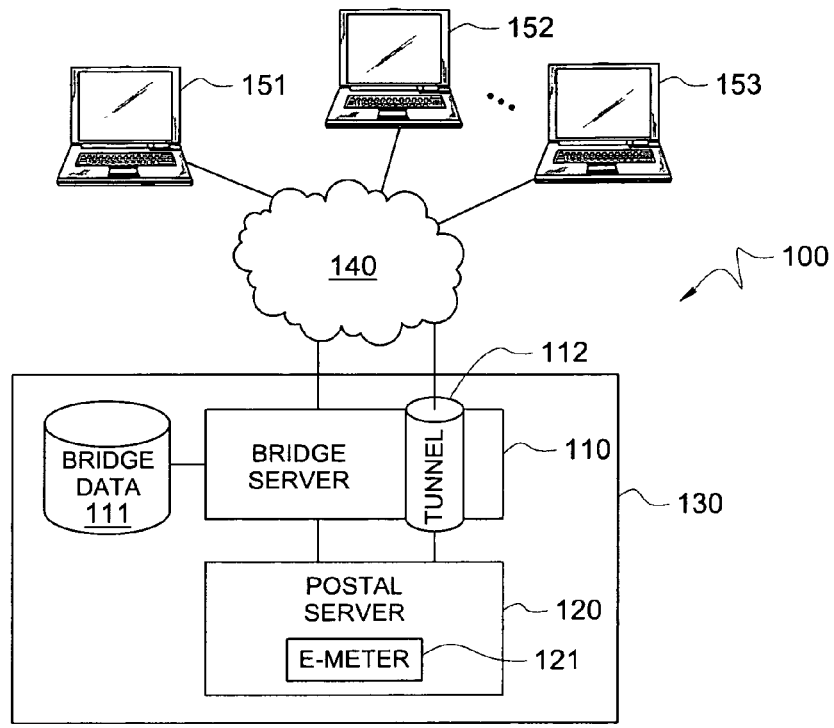
FIG. 1 shows a system adapted according to an embodiment of the present invention.

Directing attention to FIG. 1, online postage generation and printing system 100, providing postage generation and printing services (one example of a secure application) to users at terminals 151-153 via network 140 using secure postal server 120, adapted according to an embodiment of the invention is shown. Although illustrated as personal computer systems, terminals 151-153 may comprise any terminal configuration (e.g., personal digital assistant, cellular telephone, two-way pager, processor-based kiosk, etcetera) suitable for desired user interaction with postal server 120 via network 140 and bridge server 110. Bridge server 110 and postal server 120 may be operable upon any number of processor-based host systems, such as INTEL PENTIUM based servers, as are well known in the art.

Network 140 may comprise any network configuration (e.g., local area network (LAN), metropolitan area network (MAN), wide area network (WAN), wireless network, fiber optic network, intranet, extranet, the Internet, etcetera) suitable for desired user interaction with bridge server 110, it being appreciated that the network configuration implemented by bridge server 110 may be different than that directly supported by postal server 120 thereby resulting in bridge server 110 providing network bridging services in addition to the security protocol bridging discussed below. Communications between a client and a bridge server of embodiments are encrypted (e.g., using secure socket layer (SSL) communications) to prevent eavesdropping or snooping by systems or individuals other than an intended recipient.

It should be appreciated that, although illustrated as a single bridge server and a single postal server, embodiments of the present invention may implement any number of bridge servers and secure application servers. For example, scaling may be provided by multiple ones of the bridge servers and/or secure application servers. Moreover, various different secure application servers, and perhaps corresponding bridge servers, may be provided in order to accommodate users of different secure applications. Although shown in the illustrated embodiment as separate servers, embodiments of the present invention may implement bridge server functionality and secure application functionality upon a same server or other host system.

Postal server 120 of the illustrated embodiment provides the aforementioned postage generation and printing services using proprietary security protocols native thereto. Accordingly, without adaptation according to an embodiment of the present invention, terminals 151-153 would implement a client uniquely adapted for interfacing with postal server 120, such as to query a value account stored in e-meter 121, conduct a transaction deducting value from or adding value to a value account stored in e-meter 121, etcetera. However, bridge server 110 of the illustrated embodiment is disposed between postal server 110 and terminals 151-153 and abstracts the security model of postal server 120, providing a security protocol interpreter facilitating the use of different, non-proprietary security protocols by the clients of terminals 151-153. User authentication by bridge server 110 of a preferred embodiment utilizes substantially standard (i.e., widely accepted) security protocols, such as through a client providing user name and password with a logon request. Accordingly, clients in use at terminals 151-153 may comprise a thin client, a simple browser interface, or even a third party application.

It should be appreciated that bridge server 110 of the illustrated embodiment not only provides abstracting of the security model of postal server 120, but also provides additional isolation with respect to the systems thereto. In a typical prior art configuration, postal server 120, although disposed in physical vault 130, would be coupled directly to network 140. However, postal server 120 of the illustrated embodiment is isolated from network 140 by bridge server 110, which may or may not be disposed within physical vault 130. It should be appreciated that physical access limitations, such as provided by physical vault 130, need not be provided with respect to bridge server 110 of embodiments of the invention, depending upon the requirements of a secure application utilized in association with embodiments of the present invention.

According to a preferred embodiment, bridge server 110 takes on the electronic address of postal server 120 so that all communications addressed to postal server 120 are instead directed to bridge server 110. Such addressing may be in addition to bridge server 110 having its own unique electronic address. For example, a unique address for bridge server 110 may be used by new clients adapted to implement security protocols supported by bridge server 110 (e.g., standardized clients) whereas the redirected address for postal server 120 may be used by old clients adapted to implement security protocols supported by postal server 120 (e.g., proprietary clients). Accordingly, bridge server 110 may readily recognize aspects of the client sourcing communications.

In operation according to embodiments of the invention, bridge server 110 provides bridging of security protocols between clients of terminals 151-153 and postal server 120. Accordingly, client applications of terminals 151-153 will preferably link into bridge server 110 through network 140 and the user will be authenticated by bridge server 110, such as by bridge server 110 comparing user name and password information provided by the client application to user name and password information stored in bridge data 111. A valid user will be correlated to an appropriate account (e.g., an associated value account stored in e-meter 121) of postal server 120 by bridge server 110, such as by bridge server 110 identifying a postal server account indexed to the authenticated user name in bridge data 111. Bridge server 110 will preferably negotiate with postal server 120 using the native security protocols and user credentials of postal server 120, such as may also be indexed to the authenticated user name in bridge data 111, to access the appropriate account. When the user's credentials have been authenticated, transactions may then flow from the client operable upon one of terminals 151-153 to bridge server 110, where bridge server 110 will translate those transactions into the native protocol of postal server 121, if necessary, and then postal server 121 will send responses to the client through bridge server 110, with bridge server 110 translating the responses as necessary.

Figure 2:
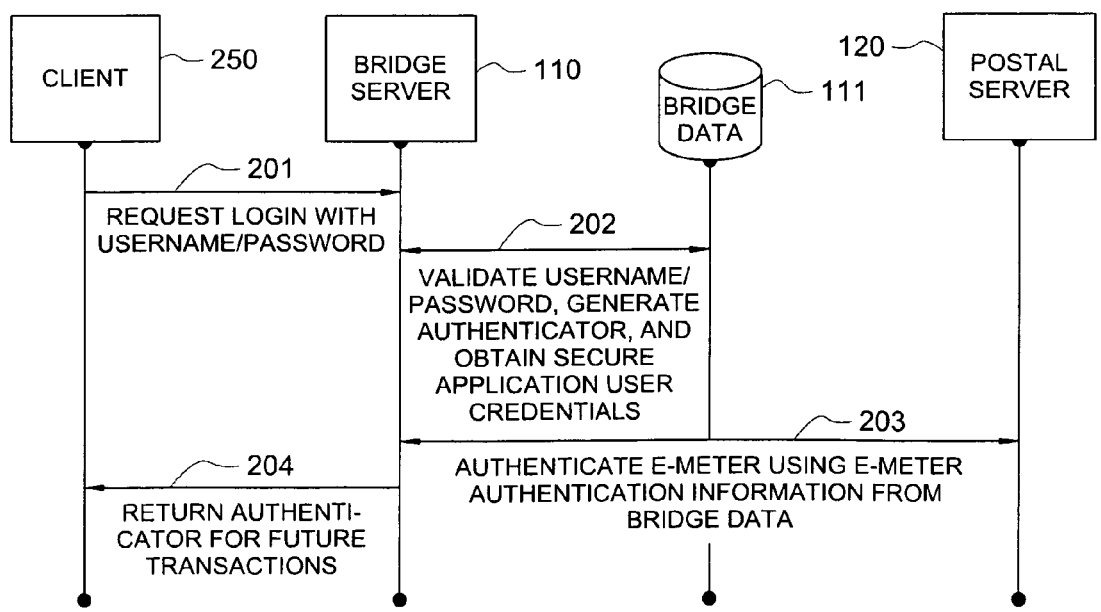
FIG. 2 shows a login transaction flow diagram according to operation of an embodiment of the present invention.

Directing attention to FIG. 2, a transaction flow diagram for an exemplary login flow according to an embodiment of online postage generation and printing system 100 of FIG. 1 is shown. The transaction flow diagram shows interaction between client 250, such as may comprise any client configuration operable upon one of terminals 151-153, bridge server 110, bridge data 111, and postal server 120 for logging a user into bridge server 110 for providing access to one or more features or functions of postal server 120.

The exemplary login flow of FIG. 2 begins at 201 wherein a login request is communicated from client 250 to bridge server 110. Communications between client 250 and bridge server 110, such as the aforementioned login request, are preferably in a standardized or widely accepted communication format or protocol. For example, embodiments of the present invention implement the simple object access protocol (SOAP) for such communications. Moreover, preferred embodiments of the invention operate to provide security with respect to communications between client 250 and bridge server 110, such as to prevent eavesdropping where network 140 comprises a public network. Accordingly, client 250 may establish a secure socket layer (SSL) connection, or other encrypted or protected communication link, with bridge server 110 for the login flow of FIG. 2 and any subsequent communications in the session associated with the login request.

In order to validate the user making the request, the login request includes a user name and password, preferably in a standard login protocol in order to facilitate the use of a wide variety of clients and/or widely available clients. Although not shown in the exemplary embodiment, the login request may further include information identifying a particular secure application the user wishes to access where bridge server 110 is operable with respect to a plurality of different secure applications. Such information may be explicit, such as to expressly identify a particular secure application (e.g., "postal"), or may be implicit, such as login packet header information or format identifying a particular client issuing the login request. According to embodiments of the invention, once a user has logged into one account, credentials for other accounts associated with that user are provided as that user accesses other accounts during a session.

At 202, bridge server 110 accesses bridge data 111 to validate the user name and password combination and to generate an authenticator string if the user name and password combination are valid. For example, the user name may be used as an index key to locate password information in a user database of bridge data 111. If the password information retrieved from the user database of bridge data 111 corresponds to the password information provided by client 250, bridge server 110 may determine that the user is valid and thus proceed to generate an authenticator string to enable further transactions between client 250 and bridge server 110.

As shown in the table below, for each individual user bridge data 111 of a preferred embodiment stores user identification, user name, password salt value (e.g., pseudo random value), and password hash (or other masked password data) which may be used in the validation of the user. According to a preferred embodiment, user passwords are not stored in bridge data 111, but rather masked password information (e.g., hashed, encrypted, decimated, etcetera) is stored in order to protect the user passwords. Accordingly, a masking algorithm (e.g., a SHA1 hashing algorithm) is run with respect to user passwords, and other sensitive information, prior to its being stored by bridge server 110 in bridge data 111. Moreover, in order to further mask password information, pseudo random information (e.g., a salt value) is added to the user password, or other sensitive information, prior to application of the masking algorithm. Accordingly, the illustrated embodiment of bridge data includes not only the password information, but also the salt value used in the masking operation.

In comparing a password provided in the login request with the password information stored in the user database of bridge data 111, an embodiment of the invention applies the same masking algorithm to the password provided in the login request and compares the result to the password information stored in the user database of bridge 111 in association with the user name provided in the password request. If the password information matches, the user is authenticated according to embodiments.

| Bridge Data<br>User Database Record<br>User Database 210 | |
|---|---|
| Field | Definition |
| User ID | Unique user identification |
| User Name | User name |
| Password Salt | Pseudo random value combined with password information to increase security of password hash |
| Password | Hash of (password + password salt value) |
| Codeword 1 Salt | Hash of (first codeword + codeword 1 salt value) |
| Codeword 2 Salt | Hash of (second codeword + codeword 2 salt value) |
| Prior Password 1 Salt | Pseudo random value combined with prior password 1 information to increase security of prior password 1 hash |
| Prior Password 1 | Hash of (prior password 1 + prior password 1 salt value) |
| Prior Password 2 Salt | Pseudo random value combined with prior password 2 information to increase security of prior password 2 hash |
| Prior Password 2 | Hash of (prior password 2 + prior password 2 salt value) |
| Prior Password 3 Salt | Pseudo random value combined with prior password 3 information to increase security of prior password 3 hash |
| Prior Password 3 | Hash of (prior password 3 + prior password 3 salt value) |
| Prior Password 4 Salt | Pseudo random value combined with prior password 4 information to increase security of prior password 4 hash |
| Prior Password 4 | Hash of (prior password 4 + prior password 4 salt value) |
| Temp Password Salt | Pseudo random value combined with temporary password information to increase security of temporary password hash |
| Temp Password | Hash of (temporary password + temporary password salt value) |

From the above table, it can be appreciated that a user database utilized according to embodiments of the invention may include information in addition to that used in validating the user. For example, code words 1 and 2 may be utilized in the case of the user having forgotten their password in order to validate the user for generation of a new password. Such code words may be utilized for bridge server 110 generating a new user password and/or for postal server 120 generating a new password. The temporary password may be utilized to issue the user a temporary password to facilitate the user accessing bridge server 110 and/or postal server 120 to generate a new password in the case of the user having forgotten their password. Prior passwords 1-4 may be used to prevent a user from reusing a prior password in a cycle of less than a selected number of password rotations. As with the active password, the prior passwords and/or temporary password are preferably not stored by bridge data 111, but rather a masked version of these passwords are stored, again using a salt value or other pseudo random value to further mask the password information.

Other information stored in association with users in the user database of the exemplary embodiment includes user identification information. This user identification information may be used as a user identifier in the authenticator string, as an index key for identifying relational data stored in other databases, such as application link databases discussed below, etcetera.

Continuing with the exemplary operation at 202 of FIG. 2, assuming that bridge server 110 has successfully validated the user's credentials, bridge server 110 generates an authenticator string for use by the client in a subsequent transaction with bridge server 110. The authenticator string of a preferred embodiment includes information setting an expiration time for the authenticator, information identifying the user, information identifying the conversation type, information identifying the state of the conversation, and information for authenticating the authenticator string. For example, an embodiment of the invention provides an authenticator string including the following variables:

exp (authenticator string expiration, e.g., 24 hours from time the authenticator string is issued)

uid (unique user identifier, preferably unique shorthand user identifier associated with the user name provided by the client in the login request)

cty (conversation type, e.g., "postal," to identify the particular secure application where the bridge server provides operation with respect to a plurality of different secure applications)

ctk (conversation token, preferably uniquely identifies or is uniquely associated with the current state of the conversation between the client and the bridge server, may be a random number generated for each authenticator string to identify replay attacks)

mac (message authentication code, preferably comprises a hash (e.g., HMAC-SHA1 hash) of the authenticator string and a secret known only to the bridge server, or the result of another masking algorithm applied to the authenticator string)

wherein exp, ctk, and mac change for each authenticator string.

Referring still to 202 in FIG. 2, assuming that the user has been validated, bridge server 110 obtains the user's credentials for the secure application(s). For example, bridge server 110 may use the user identification information stored in association with the user name in the user database of bridge data 111 to locate an appropriate record in one or more application link databases (e.g., postal link database, banking link database, e-commerce link database, etcetera) of bridge data 111, and thereby obtain the secure application customer identification information used with respect to this user. This secure application customer identification information may be used to access an appropriate record in a secure application account database (e.g., postal meter account database, bank account database, e-commerce purse database, etcetera) of bridge data 111, and thereby obtain the credentials for use by bridge server 110 with respect to the secure application account the user is authorized to access.

According to a preferred embodiment, the aforementioned application link database and secure application account database cooperate to provide mapping of multiple users to a single secure application account. For example, each user authorized to access a particular secure application will preferably have a unique record indexed by their user identification information in an appropriate application link database (e.g., postal link database for users authorized to access a postage generation and printing secure application). A plurality of these users may map to a same secure application account by having the same customer identification information stored in their respective records in the application link database. Each such user would then preferably be mapped to a same record in the appropriate secure application account database (e.g., postal meter account database), and thus would share use of the same secure application account.

Secure application account database records of preferred embodiments not only store credentials used for accessing the appropriate secure application account, but also preferably dynamically store operational status data, such as may be utilized in serializing use of the secure account by multiple users. For example, an "in use" field may be utilized as a flag to cause bridge server 110 to delay a transaction when a first user has been verified and is conducting a transaction using the secure application account and a second user is attempting to begin a transaction using the same account.

It should be appreciated that, in addition to in the alternative to mapping multiple users to a single secure application account, embodiments of the present invention provide for mapping a single user to multiple secure applications. For example, user identification information associated with a particular user in the user database of bridge data 111 may correspond to a record in each of a plurality of application link databases (e.g., postal link database, banking link database, e-commerce link database, etcetera) of bridge data 111. Accordingly, customer identification information in each such application link database may correspond to secure application account credentials stored in appropriate ones of the secure application account databases (e.g., postal link database, banking link database, e-commerce link database, etcetera) of bridge data 111, thereby facilitating access to a plurality of secure application accounts by that user.

An exemplary embodiment of postal link database (example application link database) record format and postal meter account database (example secure application account database) record format are provided in the tables below. As discussed above, the postal link database record of this exemplary embodiment is related to a user database record through the user ID field. Similarly, the postal meter account database record of this exemplary embodiment is related to a postal link database record through the customer ID field.

| | Bridge Data<br>Postal Link Database Record |
|---|---|
| Field | Definition |
| User ID | Unique user identification |
| Customer ID | Unique customer identification for postal meter account |
| CTK | Current conversation token (pseudo random value created for each exchange between the bridge server and client with respect to a postal session) |
| PCTK | Prior conversation token (conversation token used for immediate past exchange between the bridge server and client with respect to a postal session) |
| User Caps | Limitations on the user's ability to access features and functions of the postal application and postal meter account |

As discussed above, an authenticator string is preferably used to validate subsequent communications from the client to ensure that such communications continue to issue from the client at which the user was validated in the login request. The current conversation token of the above exemplary embodiment comprises a pseudo random number that is generated by bridge server 110 for each authenticator string. By constantly updating the authenticator string in this manner, a replay attack is readily detected. According to a preferred embodiment, the current conversation token included in the authenticator string returned by the client in a next communication is compared to that stored in the postal link database of bridge data 111. If the conversation token does not match, the communication may be from an imposter client or from an out of sync actual client. The illustrated embodiment of the invention includes a prior conversation token to accommodate an out of sync actual client, such as in the case of a time out in the communication from the bridge server to the client and the client reissuing a communication. If the conversation token in the authenticator returned from the client does not match the current conversation token, but rather matches the prior conversation token, embodiments of the invention may operate to allow the client to continue without re-validating the user (e.g., notify the client of the failed exchange and handshake to synchronize the status of the transaction).

User configuration and management provided by a bridge server of embodiments of the present invention provides for various users having different levels of access to, or access to different features of, the secure application and/or bridge server. For example, various users may be allowed to query an account balance and to conduct a transaction debiting the account (perhaps limited to a certain value, aggregate value per period of time, etcetera), whereas other users may only be allowed to deposit funds into the account. Accordingly, the user caps filed of the exemplary postal link database field includes information with respect to the level of access and/or the different features of the postal application the user is authorized for. This information may establish a user as administrative user, for example, such as to create additional users, establish limits on the features and functions of the bridge server and/or secure application such users are allowed to access, disable individual user's access to the bridge server and/or secure application, etcetera.

| Bridge Data Postal Meter Account Database Record | |
|---|---|
| Field | Definition |
| Customer ID | Unique customer identification for postal meter account |
| Postal Conversation | Postal application credentials sufficient for the bridge server to access the appropriate postal meter account |
| Minimum Client Version | Lowest client version permitted to access the postal application through the bridge server |
| In Use | In use flag for indicating the postal meter account is currently in use by a user |
| In Use By Machine | Identification of bridge server setting the in use flag as using the postal meter account |

Additional credentials as may be needed by the postal application are preferably stored in the postal meter account database record as the postal conversation field. Accordingly, bridge server 110 may reference these credentials by the customer ID corresponding to the user's user ID.

The minimum client version of the exemplary embodiment may be used in accommodating a migration from clients using a proprietary protocol operable directly with postal server 120 to clients using a protocol (e.g., industry standard security protocol) operable with bridge server 110. For example, where one user associated with a particular customer ID or postal meter account has invoked a new client using a protocol operable with bridge server 110, bridge server 110 may negotiate with postal server 120 to take ownership of the postal credentials (e.g., stored in the postal conversation field of the postal meter account database record of bridge data 111 after a re-registration process). Therefore, subsequent users associated with that particular customer ID or postal meter account invoking an old client using a protocol operable directly with postal server 120, and thus possessing an out of date set of postal credentials (although expecting to exchange those credentials with postal server 120), may no longer be able to access features of postal server 120. Accordingly, bridge server 110 may recognize the client version (such as within a header of the login request, in a format of the login request, by the particular address the login request was directed toward, etcetera) and require that at least a minimum client version (e.g., an earliest client version implementing the security protocols supported by bridge server 110) be used. If the client version is less than the minimum client version, bridge server 110 may issue a error code causing the user to contact customer support to obtain a newer client version.

The in use field of the exemplary embodiment is utilized to cause bridge server 110 to delay a transaction with a second user when a first user is conducting a transaction using the secure application account. Such serialization of user access to the postal meter account prevents situations where an account balance appears sufficient for each user's transaction separately, but as one user commits the funds the other user's transaction fails. In operation according to a preferred embodiment, the in use field would delay the second user's query of the account balance until the first user completed the transaction (or timed out), thus showing the second user the available account balance after the first user's transaction. Of course, where such serialization is not desired, embodiments of the invention may operate to allow parallel access to secure application accounts (or parallel access with respect to particular account transactions).

The in use by machine filed of the exemplary embodiment is utilized in clearing a "hung" transaction in the case of a bridge server failure. For example, where a plurality of bridge servers are implemented to support a high volume of user transactions, a particular bridge server may mark a postal meter account as in use and then the bridge server may malfunction and fail to complete the transaction. Other users, perhaps accessing the postal meter account via other ones of the bridge servers, may be delayed indefinitely waiting for the failed bridge server to release the postal meter account. However, because the particular bridge server which marked the postal meter account as in use is identified, the postal meter account may confidently be released knowing that the bridge server has failed and will not complete the transaction.

Continuing with the exemplary login flow of FIG. 2, if validation of the user at 202 is unsuccessful, the user is not permitted access to postal server 120 by bridge server 110. However, if validation of the user at 202 is successful, bridge server 110 accesses the postal application credentials from the appropriate postal meter account database field of bridge data 111. Accordingly, at 203 bridge server 110 uses the postal meter account credentials obtained from bridge data 111 to establish a conversation with postal server 120 on behalf of the user, thus implementing a bridge between client 250 and postal server 120.

At 204, bridge server 110 communicates with client 250 indicating that the login request has been successful and providing an authenticator string for use with the next communication from client 250 to bridge server 110. Embodiments of the invention provide the authenticator string as a "cookie" (e.g., browser data packet) or other "out of band" data packet (e.g., separated from the primary session data). For example, the authenticator string may be transmitted with a login acknowledgement response as a non-persistent cookie that is to be held in memory by client 250 and returned with a next communication to bridge server 110. The use of such cookies is advantageous because the client need not implement any proprietary protocols to identify the data packet and separate it from the "in band" session data. Moreover, protocols for receiving and re-transmitting cookies are available in many industry standard clients, thereby facilitating the use of standardized client interfaces. The use of a non-persistent cookie is preferred in order to avoid storage of the authenticator string in non-volatile memory, such as a hard disk, and thus provide additional security against the misuse of the authenticator string.

Having successfully logged into bridge server 110 and received an authenticator string, client 250 is configured to conduct communications with bridge server 110 for various transactions with postal server 120. For example, assuming the information in the user caps field of the exemplary embodiment permits the user to do so, the user may query a value account stored in e-meter 121, conduct a transaction deducting value from or adding value to a value account stored in e-meter 121, etcetera.

Figure 3:
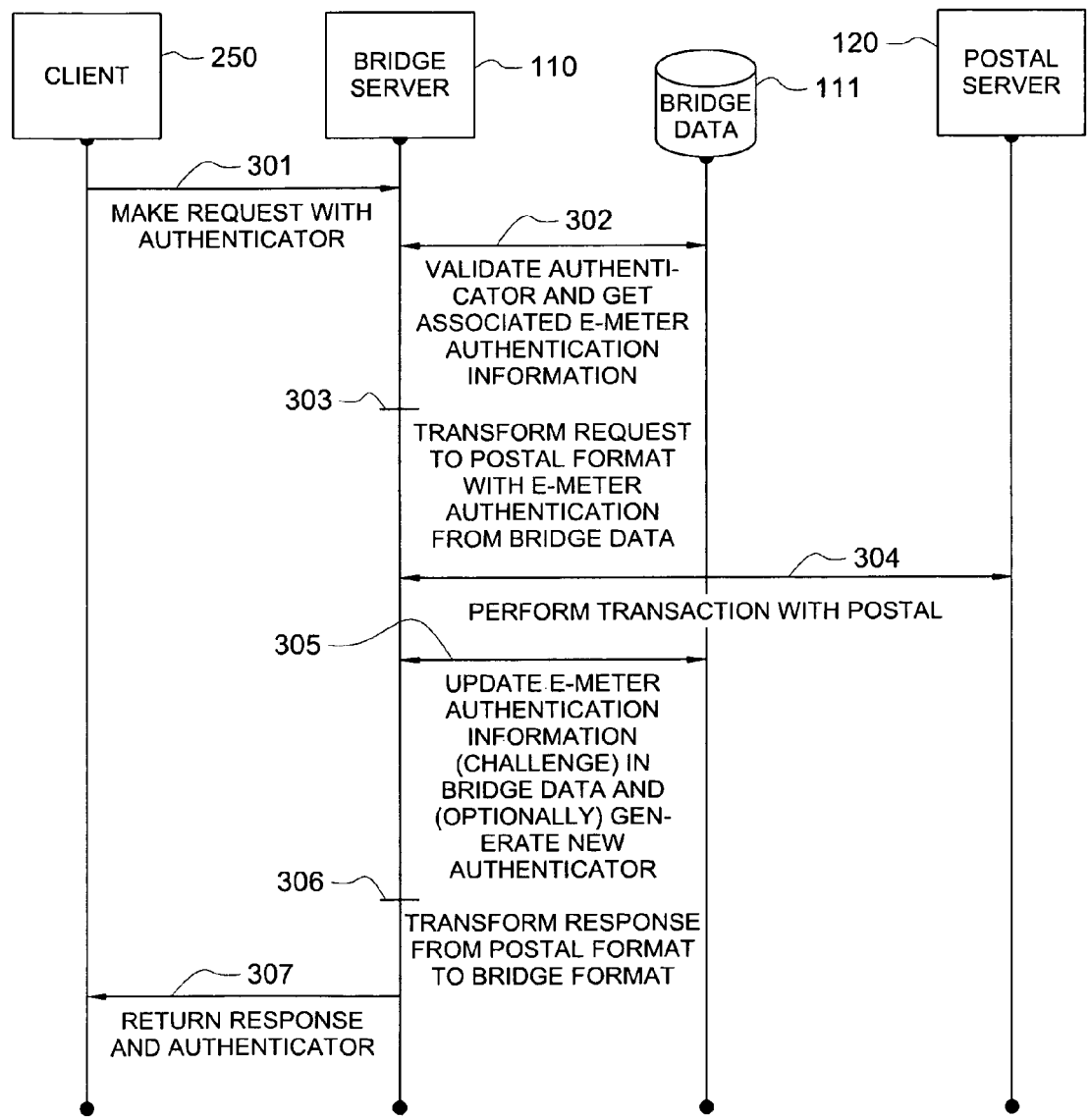
FIG. 3 shows a transaction flow diagram according to operation of an embodiment of the present invention.

Directing attention to FIG. 3, a transaction flow diagram for an exemplary post-login transaction flow according to an embodiment of online postage generation and printing system 100 of FIG. 1 is shown. The transaction flow diagram shows interaction between client 250, bridge server 110, bridge data 111, and postal server 120 for a user accessing one or more features or functions of postal server 120 through bridge server 110.

At 301, client 250 sends a communication making a request for a desired operation to bridge server 110. This request is accompanied by the authenticator string received from bridge server 110 in the last communication (e.g., responsive to the login request transaction flow discussed in FIG. 2 above or responsive to a previous communication in accordance with the transaction flow of FIG. 3).

Bridge server 110, at 302, accesses information stored by bridge data 111 to validate the authenticator string. For example, bridge server 110 may use a message authentication code of the authenticator string to verify that the verification string has not been tampered with. According embodiments of the invention, bridge server 110 analyzes the expiration information within the authenticator string to determine if the authenticator string is still valid. If the expiration data is out of date (expired), bridge server 110 preferably re-validates the user. For example, a message may be sent to client 250 to cause the user to input their user name and password for a renewed login request in accordance with the transaction flow of FIG. 2. However, if the expiration information is in date (not expired), bridge server 110 may then compare the conversation token contained within the authenticator string with that stored in the postal link database field associated with the user ID contained within the authenticator string. If the conversation token does not match the current conversation token, bridge server 110 may issue an error message and prevent the transaction. If the conversation token matches the prior conversation token stored in the postal ink database, bridge server 110 of embodiments may allow resynchronization of the conversation between client 250 and bridge server 110 without initiating a renewed login request.

Assuming that the authenticator string was successfully validated, bridge server 110 of the illustrated embodiment retrieves the postal account information stored in the postal meter account field for the customer ID associated with the user ID contained within the authenticator string. At 303, bridge server 110 transforms the transaction request received from client 250 accompanying the authenticator string into a format or protocol acceptable to postal server 120. For example, bridge data 111 may comprise a look-up table (LUT) accessed by bridge server 110 which correlates transaction requests from clients adapted to implement protocols supported by bridge server 110 (e.g., standardized clients) to requests emulating those made by clients adapted to implement protocols supported by postal server 120 (e.g., proprietary clients), and thus to provide requests expected by postal server 120. It should be appreciated that there need not be a one to one relationship between the transactions supported by the new clients and old clients. For example, new requests may be defined with respect to the new clients which are comprised of a plurality of requests available to the old clients. As but one example, bridge server 110 may perform high speed batch transactions, without changes to postal server 120, by repeatedly issuing postal server requests before returning results to the client, thereby providing a transaction heretofore unavailable through postal server 120.

It should be appreciated that, although a user is a valid user of postal server 120, it may not be desired that the user be enabled to perform all available transactions with respect to postal server 120. Accordingly, embodiments of bridge server 110 operate to compare the requested transaction with user restrictions information stored in the user caps field of the postal link database. If the requested transaction is inconsistent with the user restrictions, the transaction will not be performed by bridge server 110.

At 304, bridge server 110 uses the transformed the transaction request to interact with postal server 120 on behalf of the user. For example, bridge server 110 may communicate with postal server 120 in a protocol native to postal server 120 to perform transaction requested by client 250, such as query a value account stored in e-meter 121, conduct a transaction deducting value from or adding value to a value account stored in e-meter 121, etcetera.

Bridge server 110, at 305, preferably generates a new authenticator string in preparation for providing a response to client 250 accompanied by an authenticator string, as discussed above. Dynamic information in the authenticator string, such as the conversation token and prior conversation token, is preferably stored in bridge data 111 (e.g., in the conversation token field and prior conversation token field of the appropriate postal link database record). Moreover, secure interaction with postal server 120 may result in security credentials possessed by bridge server 110 having been changed. For example, the security credentials may comprise authentication challenge information to be used in a next communication between bridge server 110 and postal server 120. Such dynamic information is also preferably stored in bridge data 111 (e.g., in the postal conversation field of the appropriate postal meter account database record).

At 306, bridge server 110 transforms the response received from postal server 120 into a format or protocol acceptable to client 250. For example, the aforementioned LUT of bridge data 111 may correlate transaction responses from postal server 120 intended for clients adapted to implement protocols supported by postal server 120 (e.g., proprietary clients) into responses suitable for clients adapted to implement protocols supported by bridge server 110 (e.g., standardized clients). As with the requests above, it should be appreciated that there need not be a one to one relationship between the responses supported by the new clients and old clients.

Bridge server 110, at 307, provides the response to client 250. As discussed above, the response is preferably provided with a new authenticator string for use with a next communication between client 250 and bridge server 110.

The above described login request transaction flow (FIG. 2) and transaction flow (FIG. 3) can be combined to facilitate most any transaction between a client adapted to implement protocols supported by bridge server 110 (e.g., a standardized client) and postal server 120 via bridge server 110. However, in order for bridge server 110 of the exemplary embodiment to interact with postal server 120 on behalf of a user as set forth above, bridge server 110 should be provided ownership of the postal server credentials usually held by clients adapted to implement protocols supported by postal server 120 (e.g., proprietary clients). Accordingly, embodiments of the present invention provide a new client setup transaction flow to facilitate bridge server 110 obtaining the appropriate credentials and to establish support for new clients with respect to a particular postal meter account.

Figure 4A:
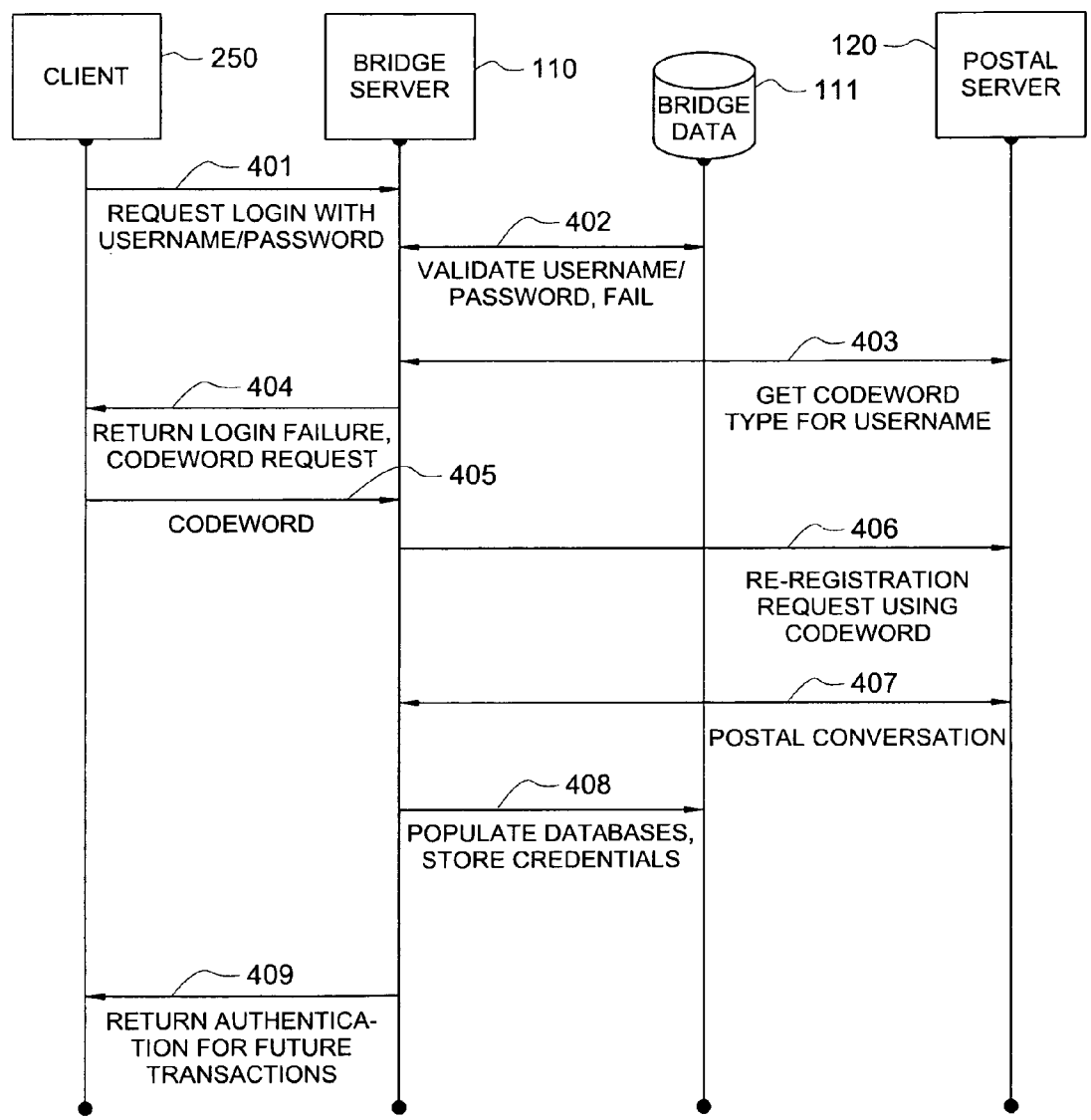
FIGS. 4A and 4B show alternative new client setup transaction flow diagrams according to operation of embodiments of the present invention.
Figure 4B:
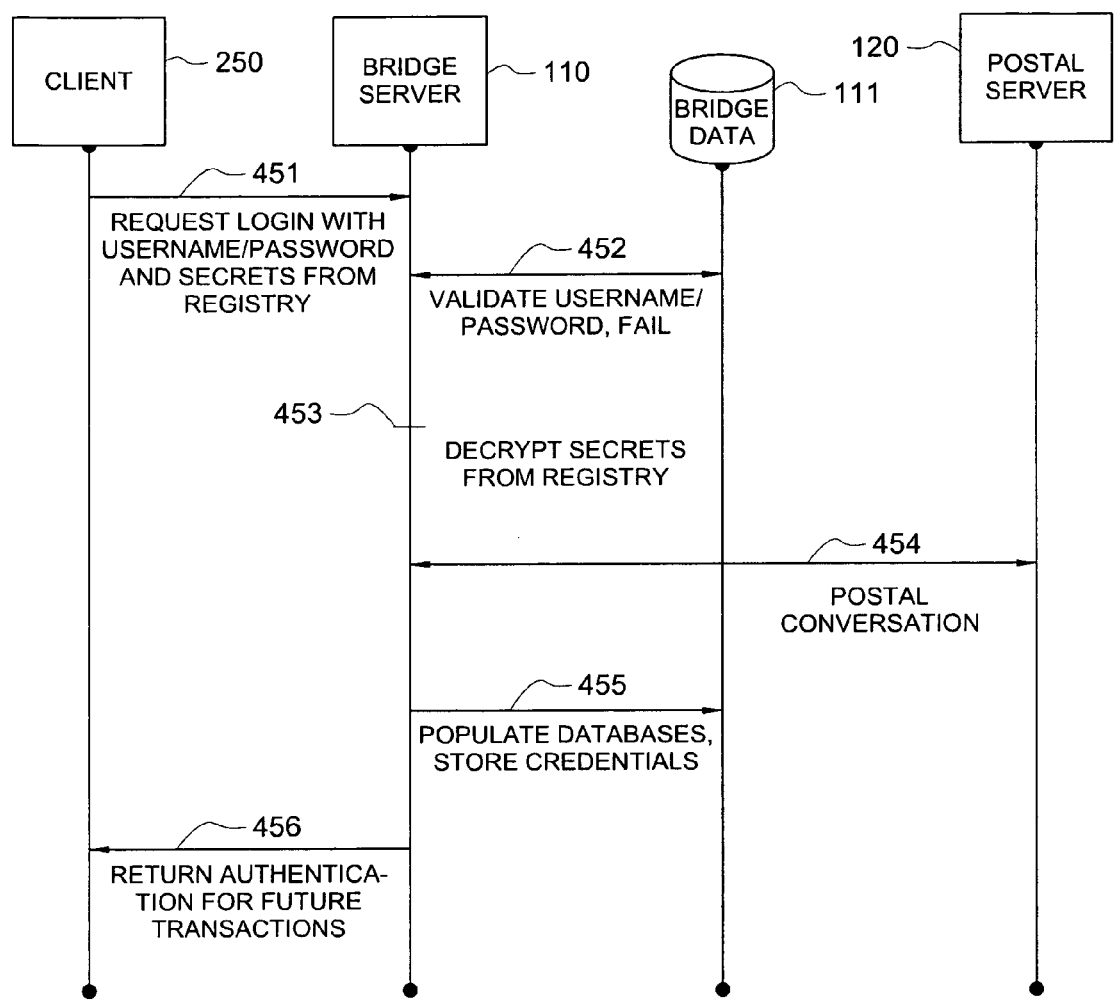

FIGS. 4A and 4B provide alternative client setup transaction flow diagrams according to embodiments of the invention. The transaction flow of FIG. 4A is particularly applicable to the situation where a client adapted to implement protocols supported by bridge server 110 (e.g., a standardized client) is installed on a terminal which is not already running a client adapted to implement protocols supported by postal server 120 (e.g., a proprietary client). The transaction flow of FIG. 4B is particularly applicable to the situation where a client adapted to implement protocols supported by bridge server 110 (e.g., a standardized client) is used to upgrade a terminal which is already running a client adapted to implement protocols supported by postal server 120 (e.g., a proprietary client).

Referring first to FIG. 4A, the transaction flow diagram shows interaction between client 250, bridge server 110, bridge data 111, and postal server 120 for new client setup to facilitate bridge server 110 interacting with postal server 120 on behalf of client 250. The exemplary client setup flow of FIG. 4A begins at 401 wherein a login request is communicated from client 250 to bridge server 110. Preferred embodiments of the invention operate to provide security with respect to communications between client 250 and bridge server 110, such as using a SSL connection or other encrypted or protected communication link. The login request of the illustrated embodiment includes a user name and password, as with the login request of FIG. 2 above, because it is expected that client 250 will be unaware as to whether bridge server 110 has been initialized for new client use with respect to the postal account to be used or not.

At 402, bridge server 110 accesses bridge data 111 to validate the user name and password combination and to generate an authenticator string if the user name and password combination are valid. However, as bridge server 110 has not been setup for new client use with respect to this particular postal account, bridge data 111 will be incomplete and thus the user validation will fail. For example, bridge data 111 may be initialized with all valid user names for any associated secure applications (e.g., postal server 120), such as to reserve their use for new client setup. However, it is expected that the passwords and other sensitive information will not be available to the operators of bridge server 110 and thus those data fields in the databases of bridge data 111 will remain null. Accordingly, the user validation failure may comprise a special failure indicating to bridge server 110 that this appears to be a valid user (e.g., the user name matches a reserved user name) but that there is no password information to validate.

Bridge server 110, at 403, uses the user name to interact with postal server 120 to request the codeword type used by this user for the forgotten password situation. Assuming the user name corresponds to a valid user name, postal server 120 returns a codeword type which may be used by bridge server 110 to issue a codeword query to the user. It should be appreciated that because bridge server 110 does not yet have the postal server credentials for the postal meter account associated with this user, bridge server 110 is performing steps to reregister the user (e.g., reauthenticate the user without creating a new or different account) and thus obtain new credentials for the postal meter account.

At 404, bridge server 110 returns a login failure message to client 250, perhaps indicating that the server needs to be initialized for use with the new client, accompanied by a codeword query for the postal server account associated with the user name. At 405, client 250 responds to bridge server 110 with the appropriate codeword.

Bridge server 110, at 406, interacts with postal server 120 as if bridge server 110 were a client adapted to implement protocols supported by postal server 120 (e.g., a proprietary client) requesting a reregistration. That is, bridge server 110 interacts with postal server 120 to conduct a reregistration request using the codeword provided by client 250. At 407 a postal conversation is conducted between bridge server 110 and postal server 120 wherein bridge server 110 obtains the postal credentials necessary to conduct future transactions with postal server 120 on behalf of client 250. The appropriate database fields of bridge data 111, including the postal conversation field of the postal meter account of the exemplary embodiment, are populated by bridge server 110 using information obtained in the interaction with postal server 120 at 408.

At 409, bridge server 110 communicates with client 250 indicating that the client setup has been successful and providing an authenticator string for use with the next communication from client 250 to bridge server 110 as discussed above. Having successfully setup the new client and logged into bridge server 110 and received an authenticator string, client 250 is configured to conduct communications with bridge server 110 for various transactions with postal server 120.

Referring now to FIG. 4B, the transaction flow diagram shows interaction between client 250, bridge server 110, bridge data 111, and postal server 120 for new client setup to facilitate bridge server 110 interacting with postal server 120 on behalf of client 250. The exemplary client setup flow of FIG. 4B begins at 451 wherein a login request is communicated from client 250 to bridge server 110. Preferred embodiments of the invention operate to provide security with respect to communications between client 250 and bridge server 110, such as using a SSL connection or other encrypted or protected communication link. The login request of the illustrated embodiment includes a user name and password, as with the login request of FIG. 2 above, because it is expected that client 250 will be unaware as to whether bridge server 110 has been initialized for new client use with respect to the postal account to be used or not. Moreover, because client 250 is being used to upgrade a previous version of a client, the login request will include secrets (e.g., postal application credentials) available from the registry of the previous version of the client.

At 452, bridge server 110 accesses bridge data 111 to validate the user name and password combination and to generate an authenticator string if the user name and password combination are valid. However, as bridge server 110 has not been setup for new client use with respect to this particular postal account, bridge data 111 will be incomplete and thus the user validation will fail. For example, bridge data 111 may be initialized with all valid user names for any associated secure applications (e.g., postal server 120), such as to reserve their use for new client setup. However, it is expected that the passwords and other sensitive information will not be available to the operators of bridge server 110 and thus those data fields in the databases of bridge data 111 will remain null. Accordingly, the user validation failure may comprise a special failure indicating to bridge server 110 that this appears to be a valid user (e.g., the user name matches a reserved user name) but that there is no password information to validate.

Bridge server 110, at 453, decrypts the secrets, such as postal application credentials, provided with the login request by client 250. At 454, bridge server 110 uses the user name and decrypted secrets to interact with postal server 120 to conduct a postal conversation between bridge server 110 and postal server 120 wherein bridge server 110 obtains the postal credentials necessary to conduct future transactions with postal server 120 on behalf of client 250. At 455, the appropriate database fields of bridge data 111, including the postal conversation field of the postal meter account of the exemplary embodiment, are populated by bridge server 110 using information obtained in the interaction with postal server 120.

At 456, bridge server 110 communicates with client 250 indicating that the client setup has been successful and providing an authenticator string for use with the next communication from client 250 to bridge server 110 as discussed above. Having successfully setup the new client and logged into bridge server 110 and received an authenticator string, client 250 is configured to conduct communications with bridge server 110 for various transactions with postal server 120.

Embodiments of the invention are further adapted to accommodate legacy clients or clients adapted to implement protocols supported by postal server 120 (e.g., proprietary clients). Accordingly, bridge server 110 may analyze a login request to determine a client version associated with the request. Such a determination may be made by looking at a format of the request, the protocol used by the request, the electronic address the request was directed to, etcetera. Having determined the client version, bridge server 110 of an embodiment of the present invention looks to data of bridge data 111 (e.g., the minimum client version field of a postal meter account or other secure application account associated with the user name) to determine if the client version is to be supported. For example, if a user has already updated to a new client in association with the postal meter account, and thus bridge server 110 has taken possession of the postal application credentials, it may be desirable not to continue to support older version clients. Thus the user may receive a response instructing them to upgrade to the new client version. However, if no user has already updated to a new client in association with the particular postal meter account, it may be desirable to allow the user to continue to use an old version client for some period of time.

Bridge server 110 of the embodiment illustrated in FIG. 1 includes tunnel 112 used to facilitate a user's continued use of an old version client. Tunnel 112 of an embodiment transports transactions between an old version client and postal server 120 through bridge server 110 unaltered. Accordingly, although actually communicating with postal server 120 via bridge server 110, bridge server 110 may be transparent to the old version client. Of course, tunneling provided by bridge server 110 may not be completely transparent to the old version client and/or a user thereof, if desired. For example, it may be desirable to periodically (e.g., upon login) inform the user of the new version client and query the user as to whether the new version should be provided for upgrading the user's terminal.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, at a bridge server, a login request from one of a plurality of users, wherein each of said plurality of users are associated with a same entity and each have respective user credentials;

validating, by said bridge server, user credentials of said user requesting said login;

identifying, by said bridge server, a secure application account of said entity that is associated with at least one secure application;

determining, by said bridge server, entity credentials that grant the entity certain rights to said entity's secure application account;

mapping, by said bridge server, said user credentials to said entity credentials; and managing, by said bridge server, interaction of said user with said at least one secure application for performing activity involving use of the secure application account on behalf of said entity, wherein said managing comprises providing at least one value-added service not available from unmapped use of the entity credentials, and said managing further comprises storing status data indicating current usage by said plurality of users of the secure application account.

2. The method of claim 1 wherein said at least one secure application comprises a postal application.

3. The method of claim 1 wherein said entity credentials comprises postal meter account credentials.

4. The method of claim 1 wherein said secure application account comprises a value account.

5. The method of claim 1 wherein said at least one value-added service comprises:
determining what of said certain rights that are granted to the entity are granted to said user; and
managing said interaction of said user with said at least one secure application consistent with the determined rights that the user is granted.

6. The method of claim 5 wherein said user is granted a subset of said certain rights that are granted to the entity.

7. The method of claim 5 wherein said at least one secure application comprises a postal application.

8. The method of claim 5 wherein said mapping specifies what of said certain rights that are granted to the entity are granted to said user.

9. The method of claim 1 wherein said at least one value-added service comprises:
monitoring use of the secure application account on a per user basis.

10. The method of claim 1 wherein said at least one value-added service comprises:
storing information detailing respective use of the secure application account by said user.

11. The method of claim 1 wherein said at least one value-added service comprises:
generating a report showing use of the secure application account on a per user basis.

12. The method of claim 11 wherein said at least one secure application comprises a postal application.

13. The method of claim 1 further comprising:
disposing said bridge server in a communication path between at least one client device and said at least one secure application.

14. The method of claim 13 wherein disposing said bridge server in said communication path comprises:
isolating said at least one secure application from said at least one client device such that any communication between said at least one client device and said at least one secure application passes through said bridge server.

15. The method of claim 13 wherein said communication path comprises a public network.

16. The method of claim 13 wherein said at least one client device comprises a plurality of client devices that comprise:
- a first group of client devices adapted to implement protocols supported by said at least one secure application; and
- a second group of client devices adapted to implement protocols supported by said bridge server.

17. The method of claim 16 further comprising:
providing data tunneling through said bridge server to said at least one secure application for said first group of client devices.

18. The method of claim 1 further comprising:
initiating, by said bridge server, a reregistration process on behalf of said user.

19. The method of claim 1 further comprising:
emulating, by said bridge server, operation of a client device adapted to implement protocols supported by said at least one secure application.

20. The method of claim 1 further comprising:
combining, by said bridge server, transactions supported by said at least one secure application to define additional transactions available to said users.

21. A system comprising:
- a bridge server disposed in a communication path between at least one client device and at least one secure application;
- wherein said bridge server is communicatively coupled to a bridge database containing information mapping, for each of a plurality of users who each have respective user credentials and are associated with a same entity having entity credentials that grant the entity certain rights to a secure application account of said entity, said user credentials to said entity credentials; and
- wherein said bridge server is configured to facilitate access by said plurality of users to said at least one secure application for conducting activity involving use of the secure application account through use of said entity credentials, while maintaining unique identification of each of said users who are so accessing the at least one secure application;
- wherein said bridge server is configured to receive a login request from one of said plurality of users using said at least one client device, validate user credentials of said user requesting said login, and determine said mapping of said user credentials to said entity credentials;
- wherein said bridge server is configured to manage interaction of said user with said at least one secure application through use of said entity credentials for performing activity involving use of the secure application account on behalf of said entity;
- wherein said bridge server is configured to provide at least one value-added service not available from use of the entity credentials unmapped to said user credentials; and
- wherein said bridge server is configured to store status data indicating current usage by said plurality of users of the secure application account.

22. The system of claim 21 wherein said at least one value-added service comprises:
- determining what of said certain rights that are granted to the entity are granted to a given one of said users; and
- managing said interaction of said given one of the users with said at least one secure application consistent with the determined rights that the given one of the users is determined as granted.

23. The system of claim 22 wherein said given one of the users is granted a subset of said certain rights that are granted to the entity.

24. The system of claim 22 wherein said at least one secure application comprises a postal application.

25. The system of claim 22 wherein said mapping specifies what of said certain rights that are granted to the entity are granted to each of said users.

26. The system of claim 21 wherein said at least one value-added service comprises:
monitoring use of the secure application account on a per user basis.

27. The system of claim 21 wherein said at least one value-added service comprises:
storing information detailing respective use of the secure application account by each of said users.

28. The system of claim 21 wherein said at least one value-added service comprises:
generating a report showing use of the secure application account on a per user basis.

29. The system of claim 28 wherein said at least one secure application comprises a postal application.

30. The system of claim 21 wherein said at least one client device utilizes standardized security protocols and said at least one secure application utilizes proprietary security protocols.

31. The system of claim 30 wherein said at least one client device comprises a web browser.

32. The system of claim 21 wherein said bridge database comprises information correlating transaction requests between a protocol used by said at least one client device and a protocol used by said at least one secure application.

33. The system of claim 32 wherein said correlation of transaction requests combines transactions of said protocol used by said at least one secure application to define a transaction of said protocol used by said at least one client device.

34. The system of claim 21 wherein said bridge database comprises:
- a user database, said user database comprising user identification and password information;
- an application link database, said application link database comprising user identification information and secure application account identification information; and
- a secure application account database, said secure application account database comprising secure application account identification information and secure application account credentials.

35. The system of claim 21 wherein said bridge server provides a data tunnel to accommodate interaction between one or more of said at least one client that is adapted to directly interact with said at least one secure application through said bridge server.

36. The system of claim 21 wherein said at least one secure application comprises a postal application and said bridge database comprises postal meter account credentials.

37. The system of claim 21 wherein said communication path comprises a public network.

38. The system of claim 21 wherein said at least one secure application comprises a postal application and wherein said secure application account comprises a value account.

39. A method comprising:
- receiving, at a bridge server, a login request from one of a plurality of users, wherein each of said plurality of users are associated with a same entity and each have respective user credentials;
- validating, by said bridge server, user credentials of said user requesting said login;

identifying, by said bridge server, a secure application account of said entity that is associated with at least one secure application;

determining, by said bridge server, entity credentials that grant the entity certain rights to said entity's secure application account;

mapping, by said bridge server, said user credentials to said entity credentials, wherein said mapping comprises determining what of said certain rights that are granted to the entity are granted to said user; and managing, by said bridge server, interaction of said user with said at least one secure application for performing activity involving use of the secure application account on behalf of said entity consistent with the determined rights that the user is granted, wherein said managing comprises providing at least one value-added service not available from unmapped use of the entity credentials, and said managing further comprises storing status data indicating current usage by said plurality of users of the secure application account.

40. The method of claim 39 wherein said at least one secure application comprises a postal application.

41. The method of claim 39 wherein said entity credentials comprises postal meter account credentials.

42. The method of claim 39 wherein said secure application account comprises a value account.

43. The method of claim 39 wherein said user is granted a subset of said certain rights that are granted to the entity.

44. The method of claim 39 wherein said managing further comprises:

monitoring use of the secure application account on a per user basis.

45. The method of claim 39 wherein said managing further comprises:

storing information detailing respective use of the secure application account by said user.

46. The method of claim 39 wherein said managing further comprises:

generating a report showing use of the secure application account on a per user basis.

47. The method of claim 46 wherein said at least one secure application comprises a postal application.

* * * * *

UNITED STATES PATENT AND TRADEMARK OFFICE
CERTIFICATE OF CORRECTION

PATENT NO.        : 8,046,823 B1                                                Page 1 of 1
APPLICATION NO.   : 11/542654
DATED             : October 25, 2011
INVENTOR(S)       : Geoffrey C. Begen et al.

It is certified that error appears in the above-identified patent and that said Letters Patent is hereby corrected as shown below:

In the Claims:

Column 21, Claim 21, Line 33, delete the portion of text reading "and".

Signed and Sealed this

Twentieth Day of December, 2011

David J. Kappos
*Director of the United States Patent and Trademark Office*